(12) United States Patent
Matsuura (10) Patent No.: US 8,797,440 B2
(45) Date of Patent: Aug. 5, 2014

(54) SOLID-STATE IMAGING DEVICE

(75) Inventor: Tomohiro Matsuura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 13/230,023

(22) Filed: Sep. 12, 2011

(65) Prior Publication Data

US 2012/0127356 A1   May 24, 2012

(30) Foreign Application Priority Data

Nov. 22, 2010   (JP) .................................. 2010-260241

(51) Int. Cl.
*H04N 5/335*   (2011.01)
(52) U.S. Cl.
USPC ............................ 348/313; 348/241; 341/155
(58) Field of Classification Search
USPC ............................ 348/313; 382/194; 341/155
See application file for complete search history.

(56) References Cited

U.S. PATENT DOCUMENTS

| | | | | |
|---|---|---|---|---|
| 6,498,332 | B2 * | 12/2002 | Funakoshi ................. | 250/208.1 |
| 7,088,279 | B2 | 8/2006 | Muramatsu et al. | |
| 7,626,532 | B2 | 12/2009 | Maruyama | |
| 7,973,570 | B2 * | 7/2011 | Pigott et al. ..................... | 327/95 |
| 8,274,416 | B2 * | 9/2012 | Kawaguchi et al. .......... | 341/144 |
| 8,502,899 | B2 * | 8/2013 | Wakabayashi et al. ....... | 348/302 |
| 2007/0052564 | A1 * | 3/2007 | Funakoshi et al. ............ | 341/118 |
| 2008/0055432 | A1 * | 3/2008 | Koseki .......................... | 348/241 |

FOREIGN PATENT DOCUMENTS

| | | |
|---|---|---|
| JP | 2005-303648 | 10/2005 |
| JP | 2008-85994 A | 4/2008 |
| JP | 2008-85994 A5 | 4/2008 |
| JP | 2008-187420 | 8/2008 |
| JP | 2008-197420 A | 8/2008 |
| JP | 2009-296423 | 12/2009 |

OTHER PUBLICATIONS

Combined Chinese Office Action and Search Report issued Nov. 28, 2013 in Patent Application No. 201110274249.8 with English Translation and English Translation of Category of Cited Documents.
Japanese Office Action issued Sep. 10, 2013, in Japan Patent Application No. 2010-260241 (with English translation).

* cited by examiner

*Primary Examiner* — Twyler Haskins
*Assistant Examiner* — Fayez Bhuiyan
(74) *Attorney, Agent, or Firm* — Oblon, Spivak, McClelland, Maier & Neustadt, L.L.P.

(57) ABSTRACT

According to one embodiment, a solid-state imaging device includes an analog-to-digital conversion circuit which subjects a first and a second pixel voltages from pixels to first and second signal processing, and outputs a digital value corresponding to a difference value between the first pixel voltage and the second pixel voltage, a reference voltage generation circuit which outputs reference voltages having first and second pulse waveforms to the analog-to-digital conversion circuit. The reference voltage generation circuit includes an integration circuit. In the first signal processing which compares the reference voltage with the first pixel voltage, the reference voltage generation circuit supplies a first current to the integration circuit, and generates the first pulse waveform, after the first signal processing, the reference voltage generation circuit supplies a second current to the integration circuit, and returns a voltage value of the first pulse waveform to an initial value.

20 Claims, 8 Drawing Sheets

SOLID-STATE IMAGING DEVICE

CROSS-REFERENCE TO RELATED APPLICATIONS

This application is based upon and claims the benefit of priority from prior Japanese Patent Application No. 2010-260241, filed Nov. 22, 2010, the entire contents of which are incorporated herein by reference.

FIELD

Embodiments described herein relate generally to a solid-state imaging device.

BACKGROUND

An image sensor obtains pixel signals corresponding to irradiating light from a subject by a photoelectric conversion element. The image sensor then converts the pixel signals having analog values to digital data, and outputs the data as image data.

When a column analog-to-digital conversion circuit is used to digitize the pixel signals, the pixel signals for one row are read at the same time, and the pixel signals for one row are digitized.

In the digitization by the image sensor, correlated double sampling (CDS) processing, for example, is used as one method of removing variation components in pixels or a comparator. In the CDS processing, a reset voltage of the pixel is output, and a signal voltage corresponding to incident light is output from the pixel. Further, a difference between the signal voltage and the reset voltage is calculated, and an image signal free from the variation components is obtained.

However, if random noise is generated during the digitization or during the CDS processing, the noise is included in the output image.

For example, noise generated by switching in the analog-to-digital conversion circuit or noise of a bias voltage supplied to the circuit may cause the noise in the output image.

DETAILED DESCRIPTION

Embodiments

Hereinafter, embodiments will be described in detail with reference to the drawings. Throughout the explanation below, elements having the same function and configuration are given the same signs and are repeatedly explained when necessary.

In general, according to one embodiment, a solid-state imaging device includes an analog-to-digital conversion circuit which subjects a first pixel voltage and a second pixel voltage from pixels respectively comprising photoelectric conversion elements to first and second signal processing, and outputs a digital value corresponding to a difference value between the first pixel voltage and the second pixel voltage; a reference voltage generation circuit which outputs reference voltages having first and second pulse waveforms to the analog-to-digital conversion circuit, the reference voltage generation circuit including an integration circuit which includes first and second input terminals, a bias circuit connected to the first input terminal, and a current source circuit connected to the second input terminal. In the first signal processing which compares the reference voltage with the first pixel voltage, the reference voltage generation circuit supplies a first current of the current source circuit to the integration circuit, and generates the first pulse waveform, after the first signal processing, the reference voltage generation circuit supplies a second current of the current source circuit to the integration circuit, and returns a voltage value of the first pulse waveform to an initial value, and in the second signal processing which compares the reference voltage with the second pixel voltage, the reference voltage generation circuit supplies the first current to the integration circuit, and generates the second pulse waveform.

(1) First Embodiment

A solid-state imaging device according to a first embodiment is described with reference to FIG. 1 to FIG. 5.

(a) Circuit Configuration

The circuit configuration of an image sensor as the solid-state imaging device according to the first embodiment is described with reference to FIG. 1 to FIG. 4.

Figure 1:
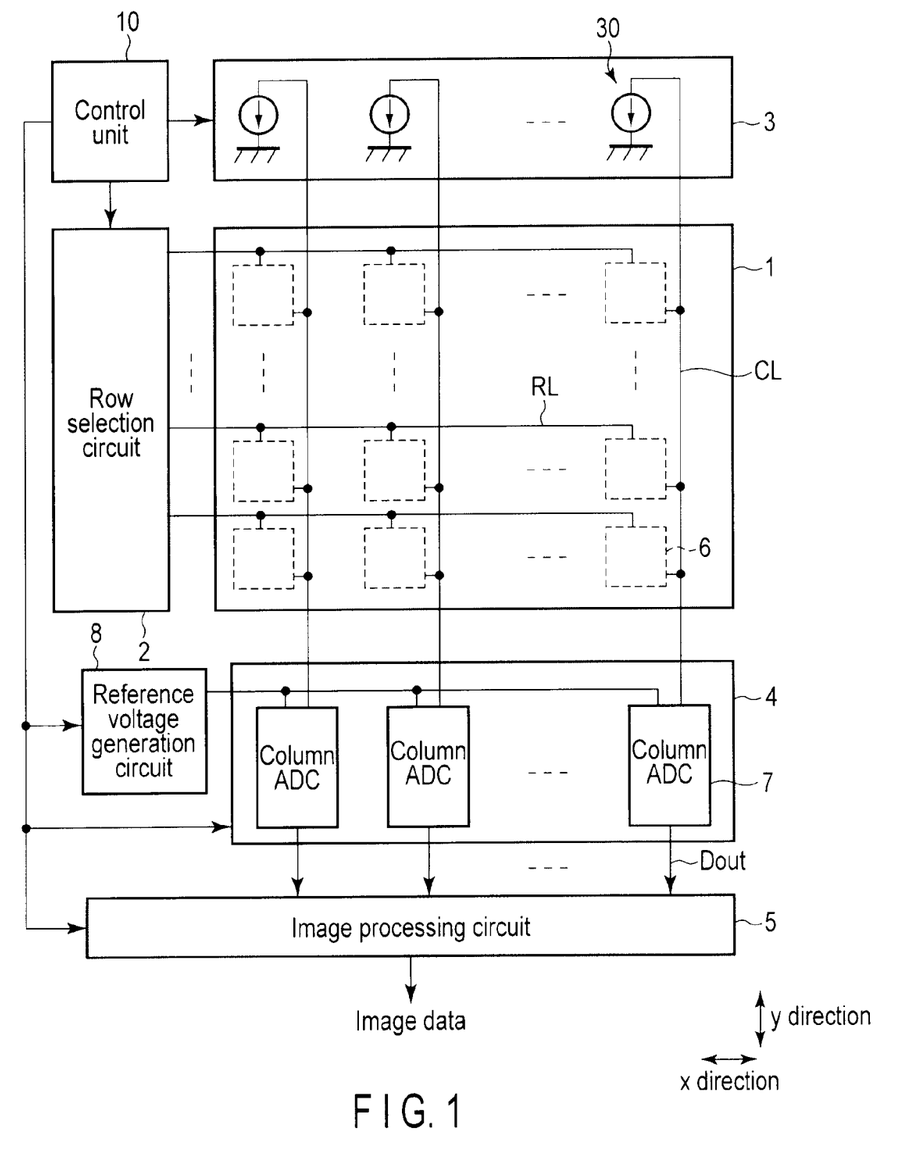
FIG. 1 is a block diagram showing an example of the entire configuration of an image sensor according to an embodiment.
Figure 2:
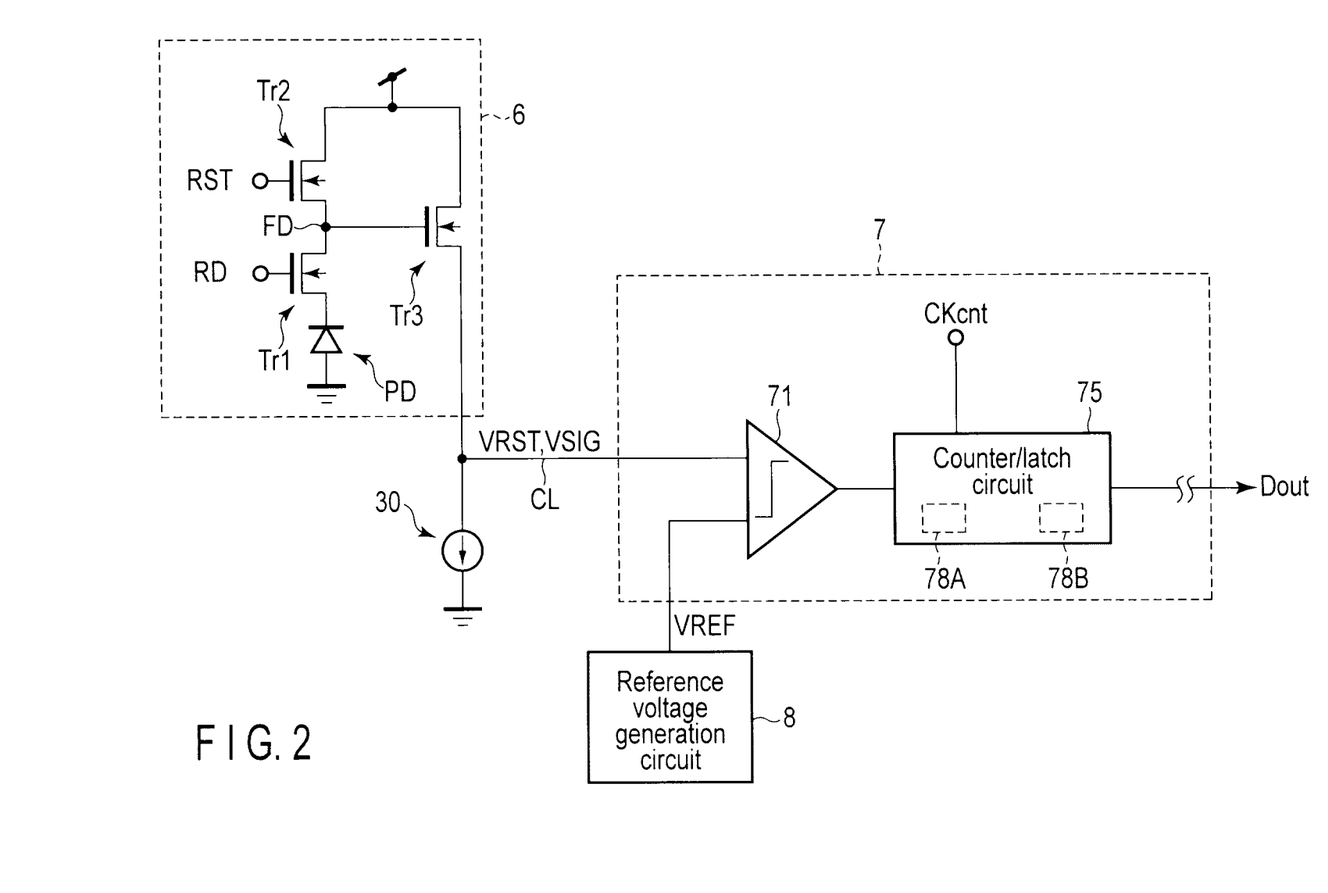
FIG. 2 is an equivalent circuit diagram showing an example of the internal configuration of the image sensor according to the embodiment.

FIG. 1 shows an example of the entire configuration of the image sensor according to the present embodiment. FIG. 2 shows an example of the internal configuration of the solid-state imaging device according to the present embodiment.

The solid-state imaging device according to the present embodiment includes a pixel region 1, a row selection circuit 2, a load circuit 3, an analog-to-digital conversion circuit (AD conversion circuit) 4, an image processing circuit 5, and a control unit 10.

The pixel region 1 includes pixels 6. For example, m×n pixels 6 are two-dimensionally arrayed along an x-direction and a y-direction. The pixel region 1 includes, for example, an effective pixel region and an auxiliary pixel region. The pixel region 1 is also referred to as a pixel array.

The pixels 6 arrayed along the x-direction (row direction) are connected to a common row control line RL. The pixels 6 arrayed along the y-direction (column direction) are connected to a common vertical signal line (also referred to as a column control line) CL. A voltage from the pixels 6 (hereinafter referred to as a pixel signal or a pixel voltage) is output to the vertical signal line CL.

FIG. 2 shows an equivalent circuit diagram of the pixel 6 and a column analog-to-digital converter (ADC) 7 connected to the vertical signal line CL. Although one pixel 6 is shown for clarity in FIG. 2, it should be understood that more than one pixels 6 are connected to one vertical signal line CL.

The image sensor according to the present embodiment is, for example, a CMOS image sensor.

As shown in FIG. 2, the pixel 6 includes, for example, one photoelectric conversion element PD and three switch elements Tr1, Tr2, and Tr3. The switch elements Tr1, Tr2, and Tr3 are field effect transistors.

The photoelectric conversion element PD is, for example, a photodiode PD. The anode of the photodiode PD is connected to a ground terminal. The cathode of the photodiode PD is connected to one end of the current path of field effect transistor Tr1 as the switch element.

The photodiode PD stores a charge (signal charge) generated in accordance with the intensity of incident light.

Field effect transistor Tr1 as the switch element is, for example, an n-channel MOS transistor. One end of the current path of field effect transistor Tr1 is connected to the cathode of the photodiode PD. The other end of the current path of field effect transistor Tr1 is connected to one end of the current path of field effect transistor Tr2 and the gate of field effect transistor Tr3.

A control signal RD is input to the gate of field effect transistor Tr1. Field effect transistor Tr1 is switched on/off under the control of control signal RD. When the pixel signal of each of the pixels 6 is output, field effect transistor Tr1 is switched on by control signal RD. A voltage value corresponding to the signal charge from the photodiode PD is output to the vertical signal line CL as a signal voltage (second pixel voltage) Vsig of the pixel 6 via field effect transistor Tr1 in an on-state. Field effect transistor Tr1 is hereinafter also referred to as a read transistor Tr1.

Field effect transistor Tr2 as the switch element is, for example, an n-channel MOS transistor. One end of the current path of field effect transistor Tr2 is connected to the other end of the current path of field effect transistor Tr1, thereby forming a node N1. The other end of the current path of field effect transistor Tr2 is connected to a power supply Vdd.

A control signal RST is input to the gate of field effect transistor Tr2. Field effect transistor Tr2 is switched on/off under the control of control signal RST. When the pixel signal of each of the pixels 6 is output, field effect transistor Tr2 is switched on by control signal RST. A voltage value corresponding to the power supply Vdd connected to the pixels 6 is output to the vertical signal line CL as a reset voltage (first pixel voltage, reference voltage) VRST of the pixel 6 via field effect transistor Tr2 in an on-state. Field effect transistor Tr2 is hereinafter also referred to as a reset transistor Tr2.

Field effect transistor Tr3 is, for example, an re-channel MOS transistor. One end of the current path of field effect transistor Tr3 is connected to the other end of the current path of field effect transistor Tr2, and also connected to the power supply Vdd. The other end of the current path of transistor Tr3 is connected to the vertical signal line CL. Transistor Tr3 has a source-follower configuration.

The gate of transistor Tr3 is connected to node N1. Transistor Tr3 is switched on/off under the control of the potential of node N1. When the pixel signal (signal voltage VSIG or reset voltage VRST) is output, a voltage value output from the current path of transistor Tr3 is modulated in accordance with the intensity of the potential of node N1 applied to the gate of field effect transistor Tr3, and a predetermined pixel signal is applied to the vertical signal line CL. Transistor Tr3 is hereinafter also referred to as an amplification transistor Tr3.

Node N1 is referred to as a floating diffusion (FD).

It should be understood that the pixel 6 is not limited to the example of the circuit configuration shown in FIG. 2, and may have a different circuit configuration.

Control signals RD and RST are supplied to the MOS transistors Tr1 and Tr2 via the row control line RL under the control of the control unit 10 and the row selection circuit 2.

The (e.g., m) row control lines RL are connected to the row selection circuit 2.

The row selection circuit 2 drives the row control lines RL under the control of the control unit 10, and selects read target pixels (a row of the pixel array) connected to the common row control line RL.

The row selection circuit 2 controls, for example, the potential of the row control line RL to supply the predetermined control signals RST and RD to the pixels 6 connected to the common row control line RL. Under the control of the control unit 10, the row selection circuit 2 substantially simultaneously outputs the pixel signals from the pixels 6 connected to the common row control line RL to the vertical signal line CL to which the pixels 6 are connected, respectively. Thus, the pixel signals for one row connected to the same row control line RL are collectively output to the analog-to-digital conversion circuit 4.

The (e.g., n) vertical signal lines CL are connected to the load circuit 3 and the analog-to-digital conversion circuit 4.

One end of each of the vertical signal lines CL is connected to a constant current source 30 in the load circuit 3. The input terminal of the constant current source 30 is connected to the vertical signal line CL, and the output terminal of the constant current source 30 is connected to the ground terminal. A predetermined potential is applied to the vertical signal line CL by the constant current source 30.

In the present embodiment, the analog-to-digital conversion circuit 4 is a column analog-to-digital conversion circuit. The analog-to-digital conversion circuit 4 includes the column analog-to-digital converters (ADCs) 7. The column ADCs 7 are provided to respectively correspond to the vertical signal lines CL. One column ADC 7 is connected to the other end of one vertical signal line CL. The column ADCs 7 are connected to a common reference voltage generation circuit 8.

The reference voltage generation circuit (also referred to as a reference signal generation circuit) 8 supplies a reference voltage (reference signal) VREF to each of the column ADCs 7.

The analog-to-digital conversion circuit 4 processes the analog pixel signal to convert the analog signal to a digital signal (data) Dout. For example, the analog-to-digital conversion circuit 4 converts the analog signal to the digital signal by digital counter processing of the pixel signals (the signal voltage VSIG and the reset voltage VRST). The analog-to-digital conversion circuit 4 generates and outputs the digital value Dout corresponding to a difference voltage between the signal voltage VSIG and the reset voltage VRST by CDS processing.

The reference voltage generation circuit 8 supplies the reference signal (reference voltage) to the analog-to-digital conversion circuit 4.

For example, as shown in FIG. 2, the column ADC 7 includes a comparator 71 and a counter/latch circuit 75.

One input terminal of the comparator 71 is connected to the vertical signal line CL, and the other input terminal of the comparator 71 is connected to the reference voltage generation circuit 8. The output terminal of the comparator 71 is connected to the counter/latch circuit 75.

The pixel signals VSIG and VRST and the reference signal VREF are input to the comparator 71. The comparator 71 compares the intensities of the signals VSIG, VRST, and VREF, and outputs the result of the comparison to the counter/latch circuit 75. More specifically, the comparator 71 compares the intensities of the reset voltage VRST and the reference voltage VREF, and compares the intensities of the signal voltage VSIG and the reference voltage VREF. The level (potential) of the output signal of the comparator 71 is reversed when the pixel signals VSIG and VRST become higher or lower than the reference signal VREF.

The output signal of the comparator 71 is input to the counter/latch circuit 75. A counter clock signal CKcnt is input to the counter/latch circuit 75. The counter clock signal CKcnt is input to the counter/latch circuit 75 substantially simultaneously with the start of the comparison by the comparator 71. In response to the input of the counter clock signal CKcnt, the counter/latch circuit 75 performs counting operation.

For example, the counter/latch circuit 75 includes a counter unit 78A and a latch unit 78B. The counter unit 78A counts a period from the input of the counter clock signal CKcnt to the reversal of the output signal of the comparator 71 by incrementing the value held by the counter unit 78A, and outputs the counted value (referred to as a count value) to the latch unit 78B. The latch unit 78B holds the input counter value. The latch unit 78B is formed to be able to hold the counter value corresponding to the reset voltage VRST and the counter value corresponding to the signal voltage VSIG in the same operation cycle.

During the comparison between the reset voltage VRST and the reference signal VREF, a counter value Drst from the input of the counter clock signal CKcnt to the reversal of the output of the comparator 71 is treated as the digital value Drst of the reset voltage VRST. During the comparison between the signal voltage VSIG and the reference signal VREF, a counter value Dsig from the input of the counter clock signal CKcnt to the reversal of the output of the comparator 71 is treated as the digital value Dsig of the signal voltage VSIG. The values Drst and Dsig may be hereinafter referred to as counter values Drst and Dsig.

In this way, the analog pixel signal is digitized by the column ADC 7 of the analog-to-digital conversion circuit 4.

The column ADC 7 subjects the input pixel signal to the CDS processing. That is, the column ADC 7 performs a calculation (difference calculation) for counter value Drst corresponding to the reset voltage VRST and counter value Dsig corresponding to the signal voltage VSIG. The calculation of the difference between the two counter values Drst and Dsig may be performed by a calculation unit (not shown) in the counter/latch circuit 75 or may be performed by the control unit 10.

The difference value Dout (Dout=Dsig−Drst) between the two counter values Drst and Dsig subjected to the CDS processing is output as the data Dout of the pixel signal. Thus, noise caused by a characteristic variation of the elements that constitute the pixel 6 can be removed by the CDS processing. The above-described digitization (AD conversion) and CDS processing by the column ADC 7 are performed in parallel row by row.

The data Dout corresponding to the pixels for one row (per row control line) is output to the subsequent image processing circuit 5 by the column analog-to-digital conversion circuit 4.

The image processing circuit 5 performs the correction and characteristic amount calculation for the input data Dout synchronously with the control by the control unit 10 to form image data for one frame obtained from the pixel region 1. The image processing circuit 5 outputs the image data to a display device (e.g., a liquid crystal display).

Figure 3:
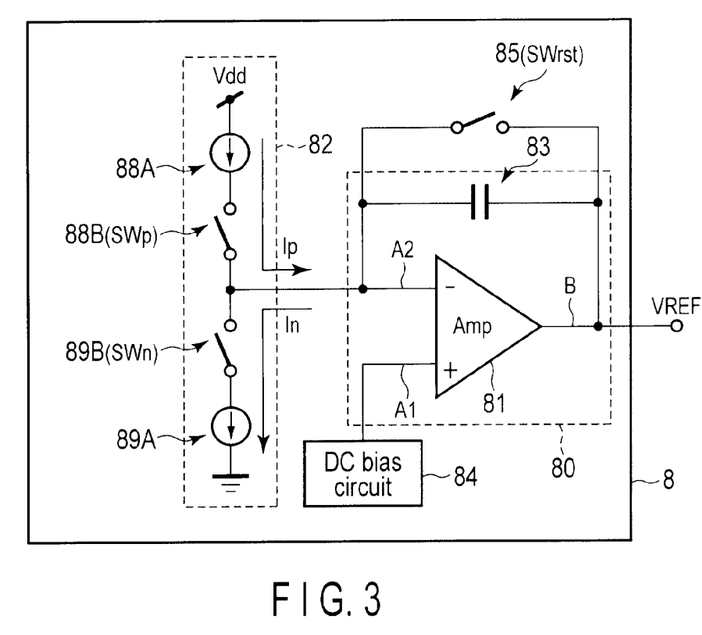
FIG. 3 is an equivalent circuit diagram showing a configuration example of a reference voltage generation circuit of the image sensor according to the embodiment.

The reference voltage generation circuit 8 in the image sensor according to the present embodiment is described with reference to FIG. 3 and FIG. 4. FIG. 3 is an equivalent circuit diagram showing the internal configuration of the reference voltage generation circuit 8 in the image sensor according to the present embodiment.

As shown in FIG. 3, the reference voltage generation circuit 8 includes, for example, an operational amplifier 81 and a capacitive element 83. The operational amplifier 81 and the capacitive element 83 form an integration circuit 80.

The operational amplifier 81 includes two input terminals A1 and A2, and one output terminal B. A bias circuit 84 is connected to one input terminal (positive input terminal or in-phase input terminal) A1 of the operational amplifier 81. A current source circuit 82 is connected to the other input terminal (negative input terminal or reverse-phase input terminal) A2 of the operational amplifier 81.

The capacitive element 83 and a switch element 85 are connected in parallel with input terminal A1 and the output terminal B of the operational amplifier 81, respectively. The capacitive element 83 is hereinafter referred to as an integral capacitor 83.

The bias circuit 84 applies, for example, a direct-current voltage (or a direct current) to input terminal A1 of the operational amplifier 81 as a reference voltage of the integration circuit 80. The bias circuit 84 is hereinafter referred to as a DC bias circuit 84.

The current source circuit 82 includes two constant current sources 88A and 89A and two switch elements SWp and SWn.

The input terminal of constant current source 88A is connected to the power supply Vdd. The output terminal of constant current source 88A is connected to input terminal A2 of the operational amplifier 81 via a switch element 88B. The output terminal of constant current source 88A is also connected to one end of the integral capacitor 83 and one end of the switch element 85 via switch element 88B. Constant current source 88A supplies a current Ip to the integration circuit 80.

The input terminal of constant current source 89A is connected to input terminal A2 of the operational amplifier 81 via a switch element 89B. The input terminal of constant current source 89A is connected to one end of the integral capacitor 83 and one end of a switch element SWrst via switch element 89B. The output terminal of constant current source 89A is connected to the ground terminal. Constant current source 89A draws a current In from the integration circuit 80, and releases the drawn current In to the ground terminal.

Switch element 88B is switched on/off under the control of control signal SWp. Switch element 89B is switched on/off under the control of control signal SWn.

When the reference voltage generation circuit 8 is in operation, the on/off of the two switch elements 88B and 89B is controlled so that one of constant current sources 88A and 89A is electrically connected to the operational amplifier 81 and the integral capacitor 83.

When switch element 88B is on (switch element 89B is off), the current Ip from constant current source 88A is supplied to the operational amplifier 81 and the integral capacitor 83.

When switch element 89B is on (switch element 88B is off), the current (discharge current) In from the integral capacitor 83 is drawn to constant current source 89A, and released to the ground terminal.

The switch element 85 is connected in parallel with input terminal A2 and the output terminal B of the operational amplifier 81. One end of the switch element 85 is connected to input terminal A2 of the operational amplifier 81, and the other end of the switch element 85 is connected to the output terminal B of the operational amplifier 81. The switch element 85 is also connected in parallel with the integral capacitor 83. One end of the switch element 85 is connected to one end of the capacitive element 83, and the other end of the switch element 85 is connected to the other end of the capacitive element 83.

The switch element 85 is switched on/off under the control of control signal SWrst. The output voltage of the operational amplifier 81 is reset to an initial value by switching on switch element 85. The switch element 85 is hereinafter also referred to as a reset switch 85.

Resistive elements may be used instead of constant current sources 88A and 89A.

The integration circuit 80 formed of the operational amplifier 81 and the integral capacitor 83 integrates the current supplied to input terminal A2 (current integration), and outputs the integration value to each column ADC 7 as the reference signal VREF.

Here, the output waveform and operation of the reference voltage generation circuit 8 according to the present embodiment are described with reference to FIG. 3 and FIG. 4. FIG. 4 is a waveform chart (timing chart) showing the output VREF and operation of the reference voltage generation circuit 8 of the image sensor according to the present embodiment. FIG. 4 shows the waveform of the output reference signal VREF and the operation of the reference voltage generation circuit 8 in a period (hereinafter referred to as a digitization period) Tad in which the pixel signal is converted from an analog signal to a digital signal in an operation sequence for the pixels for one row.

As described above, the pixel signal is digitized, and also subjected to the CDS processing. Therefore, in the operation sequence of the digitization of the pixel signal, there are two reference voltage output periods Trst and Tsig in the digitization period Tad. In the digitization period Tad, period Trst is a period in which the reference voltage VREF for sampling the reset voltage of the pixel 6 is output. In digitization period Tad, period Tsig is a period in which the reference voltage VREF for sampling the signal voltage of the pixel is output. Hereinafter, period Trst is referred to as a reset voltage sampling period Trst, and period Tsig is referred to as a signal voltage sampling period Tsig.

In the reset voltage sampling period Trst within the digitization period Tad, counter value Drst of the reset voltage Vrst from the pixel 6 is acquired by the column ADC 7. In the signal voltage sampling period Tsig of the digitization period Tad, counter value Dsig of the signal voltage Vsig from the pixel 6 is acquired by the column ADC 7.

In the reference voltage generation circuit 8 of the image sensor according to the present embodiment, when a reset voltage RST is sampled, the current source circuit 82 is driven, and the driven current source circuit 82 supplies the integration circuit 80 with the current running to the integration circuit 80 from the constant current source.

Figure 4:
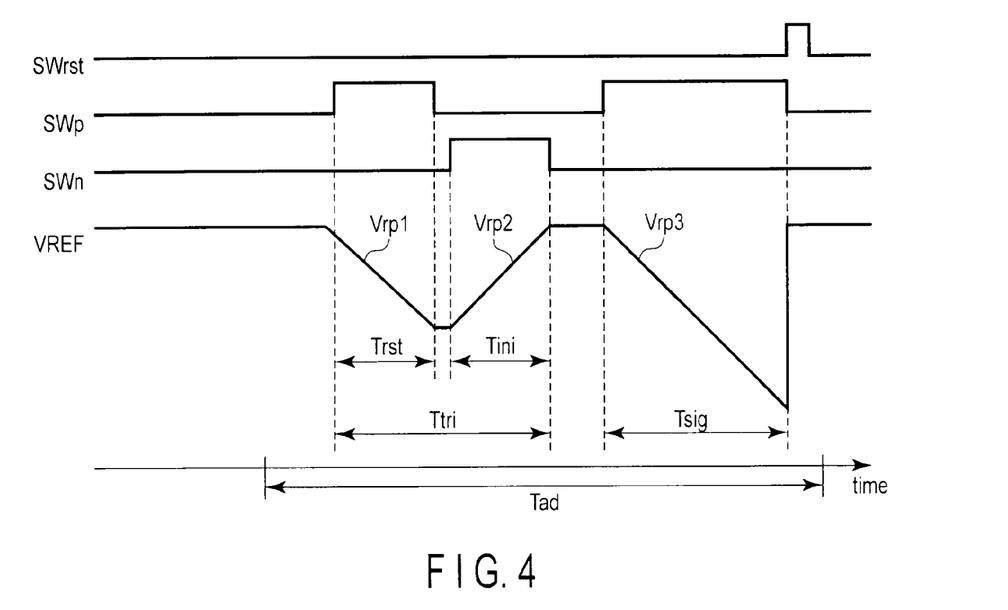
FIG. 4 is a chart for explaining the operation of the reference voltage generation circuit of the image sensor according to the embodiment.

As shown in FIG. 4, in the reset voltage sampling period Trst, control signal SWp is shifted to an "H" level from an "L" level, and switch element 88B is switched on. When switch element 88B is on, constant current source 88A is electrically connected to the operational amplifier 81 and the integral capacitor 83. The current Ip from constant current source 88A is supplied to input terminal A2 of the operational amplifier 81 and the integral capacitor 83. The level of the initial value (also referred to as an initial voltage) of the reference voltage VREF output by the operational amplifier 81 is dependent on the level of the output (reference voltage) of the DC bias circuit 84.

The initial condition of the integral capacitor 83 is, for example, a discharge condition (charge Q=0), and the integral capacitor 83 is charged by the current Ip.

In the reset voltage sampling period Trst, the reference voltage VREF is generated when the integration circuit 80 integrates the voltage supplied to input terminal A1 (the output voltage of the DC bias circuit 84) and the current supplied to input terminal A2. The value of the reference voltage VREF decreases (monotonously decreases) from the initial value in accordance with the driving characteristics of constant current source 88A as the integral capacitor 83 is charged.

In this way, in the reset voltage sampling period Trst, a voltage Vrp1 having a monotonously decreasing ramp waveform is generated by the integration (current integration) in the integration circuit 80.

After control signal SWp is changed to the "L" level from the "H" level, control signal SWn is changed to the "H" level from the "L" level. As a result, switch element 88B is switched off, and constant current source 88A is electrically disconnected from the operational amplifier 81 and the integral capacitor 83.

On the other hand, switch element 89B is switched on, and constant current source 89A is electrically connected to the operational amplifier 81 and the integral capacitor 83. That is, in the reference voltage generation circuit 8 of the image sensor according to the present embodiment, when the value of the reference voltage VREF is reset to the initial value after the sampling of the reset voltage RST (after the digital counting processing), the current source circuit 82 is driven, and the driven current source circuit 82 supplies the integration circuit 80 with the current running to the ground terminal from the integration circuit 80. The details are as follows.

The current (discharge current) In resulting from the charge held by the integral capacitor 83 is drawn to constant current source 89A in accordance with the driving characteristics of constant current source 89A, and released to the ground terminal via switch element 89B in an on-state and constant current source 89A. As the discharge current of the integral capacitor 83 is released to the ground terminal, the output voltage VREF of the operational amplifier 81 is reset to the initial value. A period Tini for resetting the value of the reference voltage VREF to the initial value by using constant current source 89A is hereinafter referred to as an initialization period Tini. In the initialization period Tini in which switch element 89B is on, control signal SWrst is kept low (at "L" level), and the reset switch 85 is kept off.

In this way, in the initialization period Tini, a voltage Vrp2 having a monotonously increasing ramp waveform is generated by the inverse integration in the integration circuit 80.

In the image sensor according to the present embodiment, the value of the reference voltage VREF is reset to the initial voltage by using the current source 89A without using the reset switch 85 after the sampling of the reset voltage VRST. Thus, after the digitization of the reset voltage VRST (before the digitization of the signal voltage VSIG), noise resulting from the on and off of the reset switch 85 during the discharge of the integral capacitor 83 is not sampled by the integral capacitor 83. Further, the adverse effect of the potential of the integral capacitor 83 resulting from the sampled noise on the after-reset initial voltage is inhibited.

For example, the relation between integration period Trst for sampling the reset voltage VRST and integration period Tini for initializing the reference voltage VREF is set to Trst=Tini. The relation between the output current Ip of constant current source 88A and the output current In of constant current source 89A is set to Ip=In. As a result, voltage Vrp1 having the ramp waveform is returned to the initial voltage before the integration.

In this case, in a period Ttri from the start of the sampling of the reset voltage VRST to the start of the sampling of the signal voltage VSIG, the reference voltage VREF in a substantially triangular shape (triangular wave) is output to the column ADC 7 from the reference voltage generation circuit 8. The reset voltage VRST is sampled in period Trst having a negative inclination (decreasing in voltage value) in the triangular-wave reference voltage VREF. The value of the reference voltage VREF is reset to the initial value in period Tini having a positive inclination (increasing in voltage value).

After the reset voltage VRST is sampled and the value of the reference voltage VREF is reset to the initial value, a current is supplied to the integration circuit 80 from the current source circuit 82, and the sampling of the signal voltage VSIG is started, substantially as in the sampling of the reset voltage VRST.

Control signal SWp is changed to the "H" level from the "L" level, and constant current source 88A is electrically connected to the operational amplifier 81 and the integral capacitor 83. In the signal voltage sampling period Tsig, a voltage Vrp3 having a monotonously decreasing ramp waveform is output to the column ADC 7 by the current integration in the integration circuit 80. After the predetermined period Tsig, control signal SWp is changed to the "L" level from the "H" level, and constant current source 88A is electrically disconnected from the operational amplifier 81.

In the signal voltage sampling period Tsig, control signal SWrst is changed to the "H" level from the "L" level, and the reset switch 85 is switched on. On the other hand, switch element 89B is not switched on. When the reset switch 85 is switched on, the terminals of the integral capacitor 83 cause a short circuit. Thus, the charge stored in the integral capacitor 83 is discharged by the reset switch 85 in an on-state, and the value of the reference voltage VREF is reset to the initial value.

Here, noise resulting from the on and off of the reset switch 85 after the completion of the sampling of the signal voltage is sampled by the integral capacitor 83, so that even if the initial value of the reference voltage VREF varies, the variation of the initial value becomes a constant DC offset noise. Therefore, the noise resulting from the variation of the initial value is removed by the CDS processing in the next operation cycle and has no adverse effect on the digitization of the signals from the pixels.

However, after the sampling of the signal voltage VSIG, the value of the reference voltage VREF may be reset to the initial value by the inverse integration in the integration circuit 80 using constant current source 89A.

In the present embodiment, periods Trst, Tini, and Tsig of integration and inverse integration in the integration circuit 80 are also referred to as integration periods Trst, Tini, and Tsig.

As described above, in the reset voltage sampling period Trst and the signal voltage sampling period Tsig, the reference voltage VREF for sampling (digitizing) the reset voltage VRST and the signal voltage VSIG is generated by the reference voltage generation circuit 8 in FIG. 3.

The image sensor according to the present embodiment drives the current source circuit 82 to supply a current to the integral capacitor 83 of the integration circuit 80 after the sampling of the reset voltage VRST, thereby resetting the value of the reference voltage VREF to the initial value before the sampling of the signal voltage VSIG.

In the image sensor according to the present embodiment, the current source circuit 82 of the reference voltage generation circuit 8 includes constant current source 89A for drawing the discharge current of the integral capacitor 83 during the initialization of the reference voltage VREF, in addition to constant current source 88A for charging the integral capacitor 83 of the integration circuit.

The reference voltage generation circuit 8 of the image sensor according to the present embodiment can reduce the noise resulting from the switching for returning the value of the reference voltage VREF to the initial value when the value of the reference voltage VREF is reset to the initial value in the operation cycle of the CDS processing for a given control unit. The reference voltage generation circuit 8 can also prevent the integral capacitor 83 from sampling this noise in the operation cycle of the CDS processing.

As a result, the image sensor according to the present embodiment can inhibit the generation of horizontal streak noise that deteriorates image quality in an image produced from the pixel signals subjected to the CDS processing and digitized by the column analog-to-digital conversion circuit.

Consequently, according to the present embodiment, the quality of the image obtained from the image sensor can be improved.

(b) Operation

The operation of the image sensor according to the first embodiment is described with reference to FIG. 5.

Figure 5:
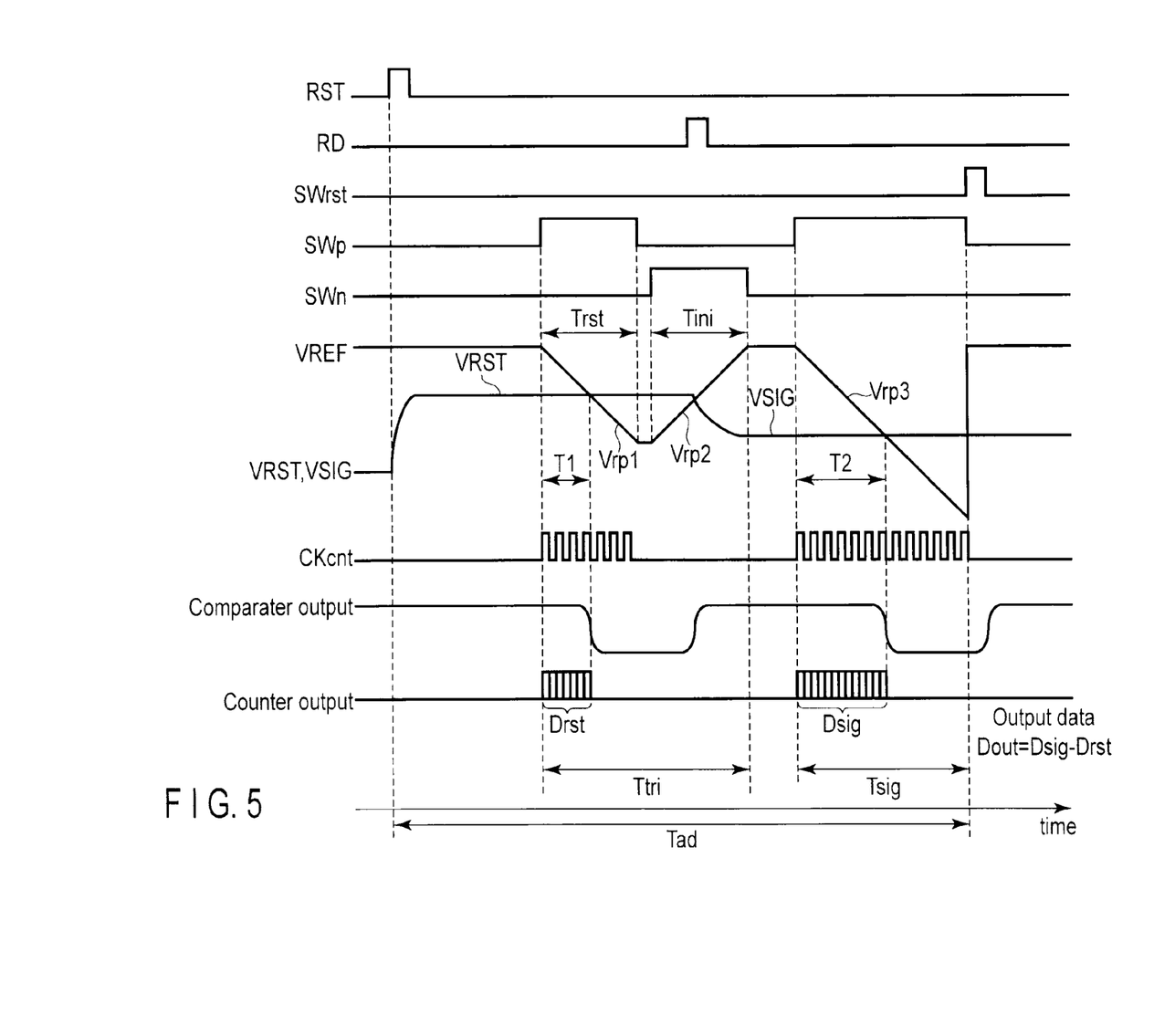
FIG. 5 is a chart for explaining the operation of the image sensor according to the embodiment.

FIG. 5 shows a timing chart for the operation of the image sensor for digitizing (AD-converting) the pixel signal (pixel voltage) read into the column analog-to-digital (AD) conversion circuit. In the image sensor according to the present embodiment, the reset voltage (first pixel voltage) and signal voltage (second pixel voltage) are sequentially read from each pixel, and subjected to the CDS processing row by row, in the operation sequence of the digitization of each row. In the present embodiment, for example, the signal voltage VSIG is processed after the reset voltage VRST is processed (signal processing). However, the present embodiment is not limited to this.

As shown in FIG. 5, in the digitization period Tad for a certain row of the pixel region 1, the control unit 10 and the row selection circuit 2 of the image sensor select a given (e.g., first) row control line RL at the start of the digitization of the pixel signal, and supply the selected row control line RL with control signal RST high ("H" level).

In the pixels 6 connected to the selected row control line RL, control signal RST is supplied to the gate of the reset transistor Tr2 of each of the pixels 6, and the reset transistor Tr2 is switched on. As a result, a power supply voltage Vdd is transferred to the floating diffusion (node) N1 via the current path (channel) of the reset transistor Tr2 in an on-state.

The potential Vdd of the floating diffusion N1 is applied to the gate of the amplification transistor Tr3, and the amplification transistor Tr3 is switched on. The reset voltage VRST corresponding to the power supply voltage Vdd is transferred to the vertical signal line CL via the current path of the amplification transistor Tr3. As a result, the reset voltage VRST as the pixel signal of the pixel 6 is output to the vertical signal line CL. After the reset voltage VRST is output to the vertical signal line CL, the control unit 10 makes control signal RST low ("L" level).

The reset voltages VRST from the pixels 6 connected to the common row control line RL are input to the respective columns ADC 7 of the analog-to-digital conversion circuit 4.

The reset voltage VRST is input to the comparator 71 of the column ADC 7, and compared with the reference voltage VREF from the reference voltage generation circuit 8.

When the reset voltage VRST is input to the comparator 71, the control unit 10 outputs a high control signal SWp to the reference voltage generation circuit 8. As a result, switch element 88B in the current source circuit 82 is switched on. When switch element 88B is switched on, the current source circuit 82 of the reference voltage generation circuit 8 is driven, and constant current source 88A is electrically connected to the integration circuit 80 including the operational amplifier 81 and the integral capacitor 83.

The current Ip is supplied to the operational amplifier 81 and the integral capacitor 83 from constant current source 88A. The integral capacitor 83 is charged by the current Ip.

The supplied current (voltage) Ip is integrated by the integration circuit 80, and the value of the reference voltage VREF monotonously decreases from the initial value. Thus, voltage Vrp1 having the ramp waveform is formed, and input to the comparator 71.

Furthermore, as shown in FIG. 5, control signal SWp is input to the reference voltage generation circuit 8, and the counter clock signal CKcnt is input to the counter/latch circuit 75. Substantially simultaneously with the start of the decrease of the value of the reference voltage VREF (the formation of the ramp waveform), the counter unit 78A starts counting in response to the input of the counter clock signal CKcnt. The counter unit 78A increments the counter value synchronously with the counter clock signal CKcnt.

As shown in FIG. 5, after a certain period (clock number) T1 since the decrease of the value of the reference voltage VREF, one of the value of the reset voltage VRST and the value of the reference voltage VREF that has been greater than the other becomes smaller than the other. As a result, the output signal of the comparator 71 is reversed, for example, from high to low.

Counter value (digital counter value) Drst corresponding to period T1 before the reversal of the output of the comparator is output to the latch unit 78B from the counter unit 78A, and counter value Drst is held by the latch unit 78B. Thus, the digital counting processing (first signal processing) of the reset voltage VRST in each of the pixels 6 for one row is completed.

Control signal SWp is kept high in the predetermined period Trst so that a time margin is ensured for the acquisition of counter value Drst.

In this way, counter value Drst corresponding to the period from the start of the comparison between the input voltages VRST and VREF to the reversal of the output signal of the comparator 71 is processed as the digital value of the reset voltage VRST. As a result, the value of the reset voltage VRST is digitized.

After making control signal SWp low, the control unit 10 makes control signal SWn high to reset the value of the reference voltage VREF to the initial value. Constant current source 88A is electrically disconnected from the operational amplifier 81 and the integral capacitor 83, and constant current source 89A is electrically connected to the operational amplifier 81 and the integral capacitor 83 by switch element 89B in an on-state. Here, the reset switch 85 connected in parallel with the integral capacitor 83 is off.

Thus, in the image sensor according to the present embodiment, when the reference voltage VREF is reset to the initial value after the sampling of the reset voltage VRST (after the digital counting processing), the current source circuit 82 is driven without switching on the reset switch 85. The current source circuit 82 supplies the current In to the integration circuit 80.

The charge of the integral capacitor 83 is drawn to constant current source 89A, and released to the ground terminal as the discharge current In. The value of the reference voltage VREF is monotonously increased by the discharge of the integral capacitor 83 using constant current source 89A (the inverse integration in the integration circuit 80), and returns to the initial value.

The control unit 10 makes control signal SWn low, and the initialization of the reference voltage VREF after the digitization of the reset voltage VRST is completed.

Thus, in contrast to the operation for resetting the value of the reference voltage VREF by using the reset switch 85, in the image sensor according to the present embodiment, the noise resulting from the on and off of the reset switch 85 has no effect on the initial value of the reference voltage VREF for sampling the signal voltage VSIG after the sampling of the reset voltage.

Furthermore, as shown in FIG. 5, the high control signal RD is supplied to the selected row control line RL, for example, in period Tini in which the value of the reference voltage VREF is reset to the initial value.

The read transistor Tr1 in each of the pixels 6 connected to the common row control line RL is switched on by control signal RD. The charge generated in the photodiode PD in response to the incident light is transferred to the floating diffusion N1 via the current path (channel) of the read transistor Tr1 in an on-state. The potential of the floating diffusion N1 varies with the amount of the transferred charge. The potential of the floating diffusion N1 corresponding to the charge amount is applied to the gate of the amplification transistor Tr3. The voltage output to the vertical signal line CL via the current path of the amplification transistor Tr3 is modulated in accordance with the potential of the floating diffusion N1. The modulated voltage is output to the vertical signal line CL as the signal voltage VSIG.

As a result, the signal voltage VSIG proportionate to the incident light is output to the vertical signal line CL as the pixel signal of the pixel 6 via the current path of the amplification transistor Tr3.

Furthermore, as in the comparison of the reset voltage VRST and the digital counting processing of the reset voltage VRST, control signal SWp is made high, and the current Ip is input to the operational amplifier 81 and the integral capacitor 83. The currents input to the operational amplifier 81 and the integral capacitor 83 are then integrated. As a result, voltage Vrp3 having a monotonously decreasing ramp waveform is generated, and voltage Vrp3 as the reference voltage VREF is compared with the signal voltage VSIG.

In the signal voltage sampling period Tsig, the counter clock signal CKcnt is input to the counter/latch circuit 75, and the counter unit 78A starts counting (incrementing) substantially simultaneously with the start of the decrease of the reference voltage VREF.

As shown in FIG. 5, after a certain period (clock number) T2, one of the value of the signal voltage VSIG and the value of the reference voltage VREF that has been greater than the other becomes smaller than the other. As a result, the output signal of the comparator 71 is reversed, for example, from high to low.

Counter value Dsig corresponding to period T2 before the reversal of the output signal of the comparator 71 is held by the latch unit 78B. Thus, the digital counting processing (second signal processing) of the signal voltage VSIG in each of the pixels 6 for one row is completed.

In this way, counter value Dsig corresponding to the period from the start of the comparison between the input signals VSIG and VREF to the reversal of the output signal of the comparator 71 is processed as the digital value of the signal voltage VSIG. As a result, the value of the signal voltage VSIG is digitized.

After counter value Dsig corresponding to the signal voltage VSIG is acquired, the value of the reference voltage VREF is reset to the initial value.

As shown in FIG. 5, in order to reset the reference voltage VREF after the digital counting processing of the signal voltage VSIG, for example, control signal SWrst is made high, and the reset switch 85 is switched on. The terminals of the integral capacitor 83 are conducted by the reset switch 85 in an on-state. The charge held by the integral capacitor 83 is released by the reset switch 85 that is switched on. Thus, the reference voltage VREF is reset to the initial value after the digital counting processing of the signal voltage VSIG.

The digitization (digital counting processing) of the signal voltage VSIG is followed by the operation for the row control line of the next address. Thus, even if noise is generated by the on/off switching of the reset switch 85 and sampled, this noise becomes a constant DC offset noise. Therefore, the noise sampled by the integral capacitor 83 is removed by the CDS processing of the pixels selected in the next operation cycle and has almost no adverse effect on the next operation cycle.

After counter value Drst of the reset voltage VRST and counter value Dsig of the signal voltage VSIG are acquired by the counter/latch circuit 75, the control unit 10 calculates a difference value between counter value Dsig and counter value Drst.

The data Dout (Dout=Dsig−Drst) corresponding to the pixels 6 connected to the common row control line RL is obtained by the CDS processing in the column analog-to-digital conversion circuit 7.

The data Dout is output to the subsequent image processing circuit 5. The image processing circuit 5 performs the correction and characteristic amount calculation for the input data Dout to form image data for one frame corresponding to the pixel region 1.

The formed image is output to a display unit (not shown). As described above, reference voltage VREF is reset by the inverse integration in the integration circuit 80 using constant current source 89A after the sampling of the reset voltage VRST from the pixels 6. Therefore, in the operation cycle of one CDS processing for a row unit, noise is prevented from being sampled by the integral capacitor 83, and an error (variation) of the initial value of the reference voltage VREF caused by the sampling of the noise can be inhibited. Accordingly, the image sensor according to the present embodiment can inhibit the generation of horizontal streak noise in a displayed image.

Consequently, according to the present embodiment, the image quality of the image sensor can be improved.

(c) Summary

The image sensor according to the first embodiment is, for example, an image sensor including the column analog-to-digital conversion circuit 4. In the image sensor according to the present embodiment, the column analog-to-digital conversion circuit 4 performs the CDS processing for the pixel signals (pixel voltages) VRST and VSIG from the pixels of each row. As shown in FIG. 3, in the image sensor according to the present embodiment, the reference voltage generation circuit 8 includes the current source circuit 82 having the two constant current sources 88A and 89A. When the current source circuit 82 is driven, constant current sources 88A and 89A supply the currents Ip and In to the integration circuit 80 in the reference voltage generation circuit 8.

As shown in FIG. 4 and FIG. 5, in the image sensor according to the first embodiment, the value of the reference voltage VREF is reset to the initial value after the sampling of the reset voltage VRST not by switching on the reset switch 85 but by the operation (inverse integration) in the integration circuit 80 using constant current source 89A. Constant current source 89A draws the current In from the integration circuit 80, and releases the charge stored in the integral capacitor 83 of the integration circuit 80.

Resetting the reference voltage VREF by the reset switch 85 (returning the voltage value to the initial value) may cause switching noise superimposed when the reset switch 85 is switched off to be sampled by the integral capacitor 83. Therefore, if such noise is sampled by the integral capacitor 83 between the sampling of the reset voltage VRST and the sampling of the signal voltage VSIG in the CDS processing, errors are generated in voltage Vrp1 used for the sampling of the reset voltage VRST and voltage Vrp3 used for the sampling of the signal voltage VSIG. Moreover, in the image sensor including the column analog-to-digital conversion circuit, the errors randomly vary whenever each row is read, and may therefore become a horizontal streak noise component in an output image.

In contrast, in the image sensor according to the present embodiment and its operation, the reference voltage VREF is reset during the sampling of the reset voltage VRST by the integration using constant current source 89A. Therefore, in the image sensor according to the present embodiment, there is in principle no generation of the horizontal streak noise component in the image resulting from the noise that is generated when the reference voltage VREF is reset.

Even if there is a variation between the two currents In and Ip output from the current source circuit 82, this variation is an error in the form of a constant DC offset. Therefore, noise resulting from the characteristic variation of the current source can be corrected by the subsequent image processing device.

Moreover, in the image sensor according to the present embodiment, the output waveform of the reference voltage generation circuit 8 during the sampling of the reset voltage VRST only varies, and there is almost no need to change the supply of the control signal to the pixels 6 and the operation timing of the counter operation (analog-to-digital conversion). Thus, the image sensor according to the present embodiment can inhibit the adverse effect of noise on the image without considerable changes in the configurations and operations of the circuits.

As described above, the image sensor according to the first embodiment can remove the main component of the horizontal streak noise in the displayed image.

Consequently, according to the first embodiment, the image quality of the image sensor can be improved.

(2) Second Embodiment

A solid-state imaging device (e.g., an image sensor) according to a second embodiment is described with reference to FIG. 6 and FIG. 7. It should be noted that parts substantially similar in configuration and function to those in the first embodiment are given the same signs and are described when necessary.

Noise resulting from a DC bias circuit 84 in a reference voltage generation circuit 8 may cause horizontal streak noise in a displayed image. The noise resulting from the DC bias circuit 84 is input to an operational amplifier 81, and superimposed on an output voltage (reference voltage) VREF of the reference voltage generation circuit 8. Moreover, the noise of the DC bias circuit 84 is often thermal noise that randomly varies with time. Therefore, the value of the reference voltage VREF randomly varies with time because of the noise of the DC bias circuit 84, so that horizontal streak noise may be generated in an image.

Figure 6:
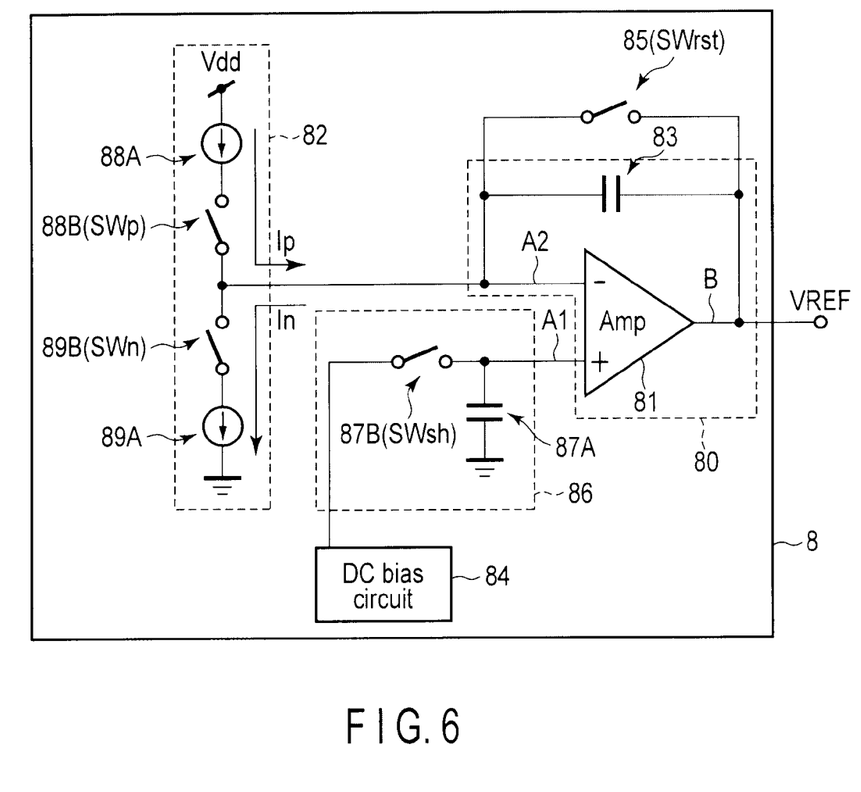
FIG. 6 is an equivalent circuit diagram showing a configuration example of a reference voltage generation circuit of an image sensor according to an embodiment.

As shown in FIG. 6, in the image sensor according to the second embodiment, a sample-and-hold circuit (hereinafter referred to as an S/H circuit) 86 is connected to the output terminal of the DC bias circuit 84. The S/H circuit 86 reduces the noise of the DC bias circuit 84.

The S/H circuit 86 is connected between the output terminal of the DC bias circuit 84 and an input terminal A1 of an integration circuit 80 (operational amplifier 81).

The S/H circuit 86 holds an output voltage of the DC bias circuit 84, and applies the held voltage to the operational amplifier 81.

The S/H circuit 86 includes a capacitive element 87A and a switch element 87B.

Switch element 87B controls the connection between the DC bias circuit 84 and the capacitive element 87A of the S/H circuit 86. Switch element 87B is switched on/off under the control of a control signal SWsh. Switch element 87B in the S/H circuit 86 is hereinafter also referred to as a sampling switch 87B.

The capacitive element 87A is charged by the output voltage (DC bias voltage) from the DC bias circuit 84 when switch element 87B is on. The capacitive element 87A applies the potential with which this capacitive element 87A is charged to input terminal A1 of the operational amplifier 81 when switch element 87B is off. The capacitive element 87A includes, for example, a capacitance Csh capable of sampling and holding the DC bias voltage as the reference voltage. The capacitive element 87A is hereinafter also referred to as a sampling capacitor.

In the image sensor according to the present embodiment, the potential of the sampling capacitor 87A charged by the DC bias circuit 84 is applied to the operational amplifier 81 without directly applying the output voltage from the DC bias circuit 84 to the operational amplifier 81. This inhibits the adverse effect of noise resulting from the DC bias circuit 84 on the processing of image signals and also inhibits the generation of horizontal streak noise in the image.

The operation and output waveform of the reference voltage generation circuit 8 in the image sensor according to the second embodiment are described with reference to FIG. 7. The digitization and CDS processing for a reset voltage VRST and a signal voltage VSIG in the image sensor according to the present embodiment are substantially the same as the operation described in the first embodiment, and are therefore not described here.

Figure 7:
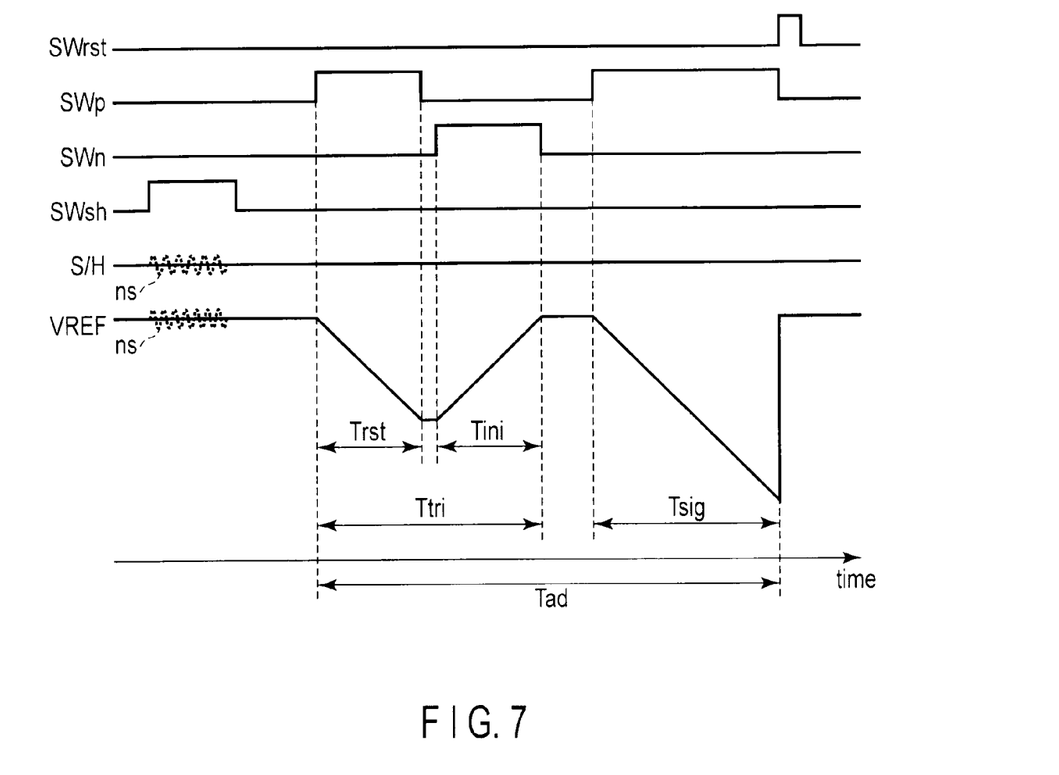
FIG. 7 is a chart for explaining the operation of the image sensor according to the embodiment.

As shown in FIG. 7, before a control signal SWp is made high, that is, before the start of the sampling of pixel signals, control signal SWsh is made high by a control unit 10. As a result, the sampling switch 87B is switched on. The DC bias circuit 84 and the S/H circuit 86 are electrically connected to each other by the sampling switch 87B in an on-state, and the DC bias voltage (or current) of the DC bias circuit 84 is applied to the sampling capacitor 87A in the S/H circuit 86.

The sampling switch 87B is kept on in a predetermined period, and the sampling capacitor 87A is charged, for example, until its potential reaches the reference voltage.

After the sampling capacitor 87A is charged to a predetermined voltage, control signal SWsh is made low, and sampling switch 87B is switched off. As a result, the output voltage from the DC bias circuit 84 is sampled/held by the S/H circuit 86.

Subsequently, the digital counting processing and CDS processing of the pixel signals (the reset voltage VRST and the signal voltage VSIG) are performed by the integration in the integration circuit 80 that uses the voltage held by the S/H circuit 86 as the reference voltage, as in the first embodiment.

In the present embodiment, when the integration circuit 80 and the column ADC 7 are in operation, the DC bias circuit 84 is electrically disconnected from the integration circuit 80 and the column ADC 7.

Noise ns resulting from the DC bias circuit 84 is generated during the sampling in the S/H circuit 86. The random noise component resulting from the DC bias circuit 84 becomes a constant DC offset noise component (hereinafter referred to as DC offset noise) during the output period of the reference voltage VREF because of the S/H operation. The DC offset noise is removed by the CDS processing in an analog-to-digital conversion circuit 4.

Thus, the image sensor according to the present embodiment can remove the horizontal streak noise in the image resulting from the DC bias circuit 84.

Consequently, in the image sensor according to the second embodiment, the image quality can be improved, as in the image sensor according to the first embodiment.

(3) Modification

A solid-state imaging device (e.g., an image sensor) according to a modification of the first and second embodiments is described with reference to FIG. 8 and FIG. 9. It should be noted that the same components as those in the first and second embodiments are given the same signs and are described when necessary.

Figure 8:
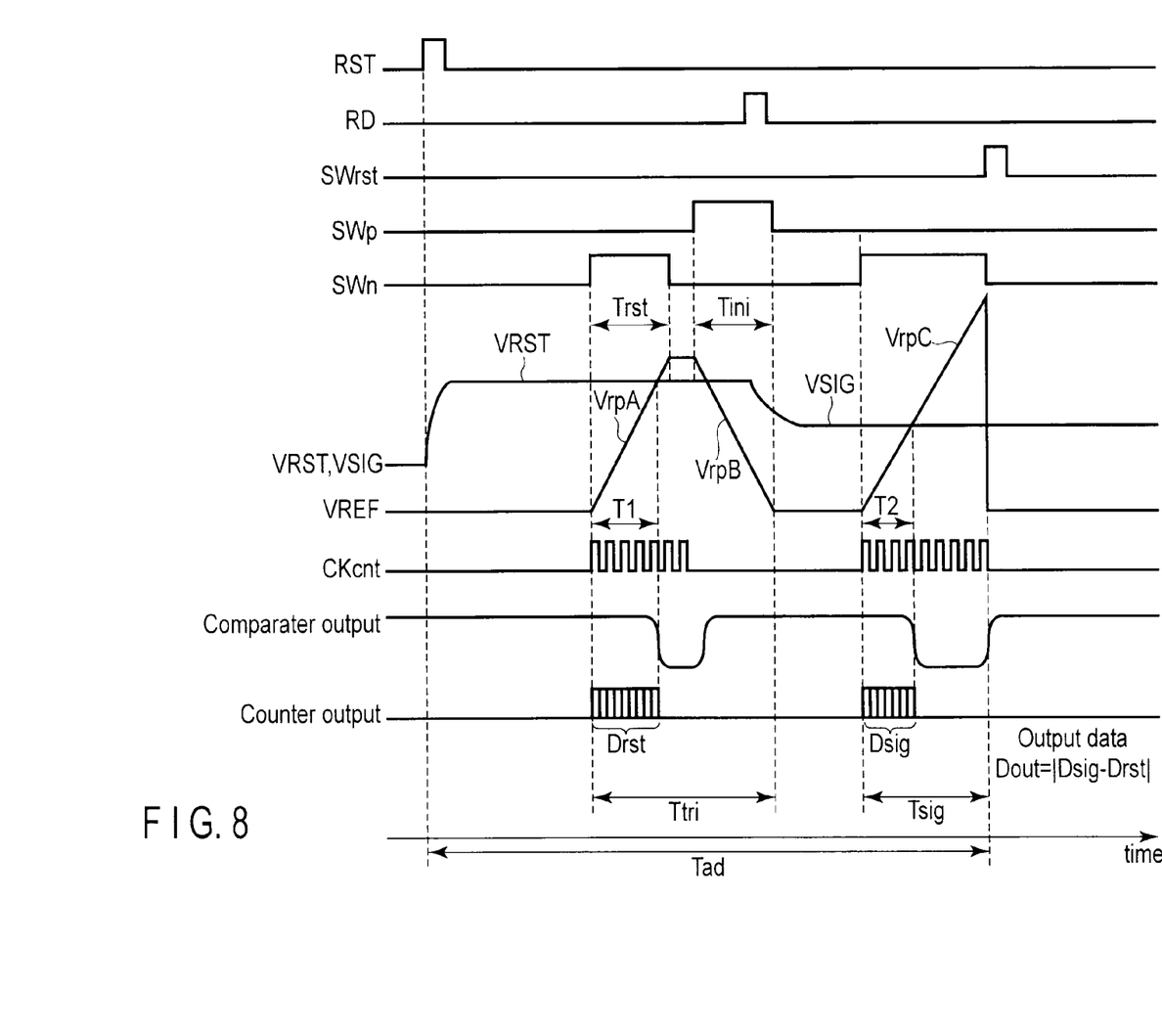
FIG. 8 is a chart for explaining the operation of an image sensor according to an embodiment.

FIG. 8 is a chart showing the operation of the image sensor according to the present modification and the output waveform of a reference voltage generation circuit 8.

In the shown operation example, the image sensor according to the first and second embodiments performs the sampling and digital counting processing of pixel signals in a period in which the value of a reference voltage VREF is decreased from an initial value.

However, as shown in FIG. 8, the sampling and counter processing of the pixel signals may be performed in a period in which the value of the reference voltage VREF is increased from the initial value. In the image sensor which performs the operation of FIG. 8, the configuration of the reference voltage generation circuit 8 may be the same as the configuration shown in FIG. 3 or FIG. 6.

For example, as shown in FIG. 8, control signal SWn is made high under the control of a control unit 10. A switch element 89B is switched on, and a constant current source 89A is electrically connected to an integration circuit 80. As a result, a current is drawn to constant current source 89A, and the value of the reference voltage VREF is increased from the initial value by inverse integration in the integration circuit 80 using constant current source 89A. In a period Trst in which switch element 89B is on, a voltage VrpA of a monotonously increasing ramp waveform is generated as the reference voltage VREF.

In a period Trst in which the value of the reference voltage VREF monotonously increases, a counter value Drst of a reset voltage VRST is acquired by the comparison between the reference voltage VREF and the reset voltage VRST, as in the first and second embodiments.

Subsequently, the value of the reference voltage VREF is reset to an initial value. Control signal SWn is made low under the control of the control unit 10. Switch element 89B is switched off, and constant current source 89A is electrically disconnected from the integration circuit 80. After control signal SWn is made low, a control signal SWp is made high. As a result, a switch element 88B is switched on, and a constant current source 88A is electrically connected to the integration circuit 80.

A current from constant current source 88A is supplied to the integration circuit 80 in a predetermined period Tini. The value of the reference voltage VREF is monotonously decreased to the initial value from the increased value by the integration in the integration circuit 80 using constant current source 88A. In a period Tini in which switch element 88B is on, a voltage VrpB having a monotonously decreasing ramp waveform is generated as part of the reference voltage VREF. Thus, as in the first and second embodiments, the value of the reference voltage VREF can be returned to the initial value without the adverse effect of noise resulting from the resetting of the reference voltage VREF.

After the reference voltage VREF is reset to the initial value, control signal SWn is again made high. A voltage VrpC having a monotonously increasing ramp waveform is generated as the reference voltage VREF by the inverse integration in the integration circuit 80 using constant current source 89A. In a period Tsig in which the value of the reference voltage VREF monotonously increases, a counter value Dsig of a signal voltage VSIG is acquired by the comparison between the reference voltage VREF and the signal voltage VSIG, as in the first and second embodiments.

After the two counter values Drst and Dsig are acquired and control signal SWn is made low, control signal SWrst is made high under the control of the control unit 10. Thus, the value of the reference voltage VREF is reset to the initial value by using a reset switch 85 after the digital counting processing of the reset voltage VRST and the signal voltage VSIG.

A difference value between counter values Drst and Dsig of the reset voltage VRST and the signal voltage VSIG in each column ADC 7 is output to a subsequent circuit 5 by the CDS processing in an analog-to-digital conversion circuit 4 as a digital value Dout (=|Dsig−Drst|) of the pixel signal.

As described above, the pixel signal sampling and the counter processing using the reference voltage VREF having a monotonously increasing value shown in FIG. 8 can be performed by a circuit similar to the image sensor according to the first and second embodiments. This can inhibit the generation of horizontal streak noise in a displayed image resulting from the noise during digitization, as in the first and second embodiments.

A modification of the image sensor according to the embodiment different from that in FIG. 8 is described with reference to FIG. 9.

In a current source circuit 82 of the reference voltage generation circuit 8, the driving characteristics of constant current sources 88A and 89A, for example, the intensities of the supply currents Ip and In of constant current sources 88A and 89A may be different from each other.

When the supply current In of constant current source 89A is higher than the supply current Ip of constant current source 88A, integration period Tini of the integration circuit 80 using the supply current In is shorter than integration period Trst of the integration circuit 80 using the supply current Ip. For example, if the intensity of the supply current In is k times, integration period Tini of the supply current In, that is, period Tini lasting before the value of the reference voltage VREF is reset to the initial value is 1/k times.

Therefore, as compared with the case where the relation between the supply currents is set to Ip=In, an integration period Tini is 1/k times integration period Trst when the intensity of the supply current In of constant current source 89A is set to be k times that of the supply current Ip of constant current source 88A. In this case, as shown in FIG. 9, the absolute value of the inclination of a voltage Vrp2' having a monotonously increasing ramp waveform is greater than the absolute value of the inclination of a voltage Vrp1 having a monotonously decreasing ramp waveform.

As a result, period Tini for resetting the value of the reference voltage VREF to the initial value is reduced, and period Tad for the counter processing and the CDS processing can be reduced. Thus, the intensity of the supply current In of constant current source 89A for resetting the reference voltage VREF is set to be higher than the intensity of the supply current Ip of constant current source 88A for sampling the pixel signals, so that the processing speed of the image sensor can be improved.

When the value of the reference voltage VREF is reset to the initial value by the supply current Ip of constant current source 88A as in the operation shown in FIG. 8, the intensity of the supply current Ip of constant current source 88A has only to be higher than the intensity of the supply current In of constant current source 89A.

While the circuit configuration and operation of the image sensor according to the first embodiment has been shown here by way of example to describe the modification of the embodiment, it should be understood that the present modification can be applied to the circuit configuration and operation of the image sensor according to the second embodiment.

Figure 9:
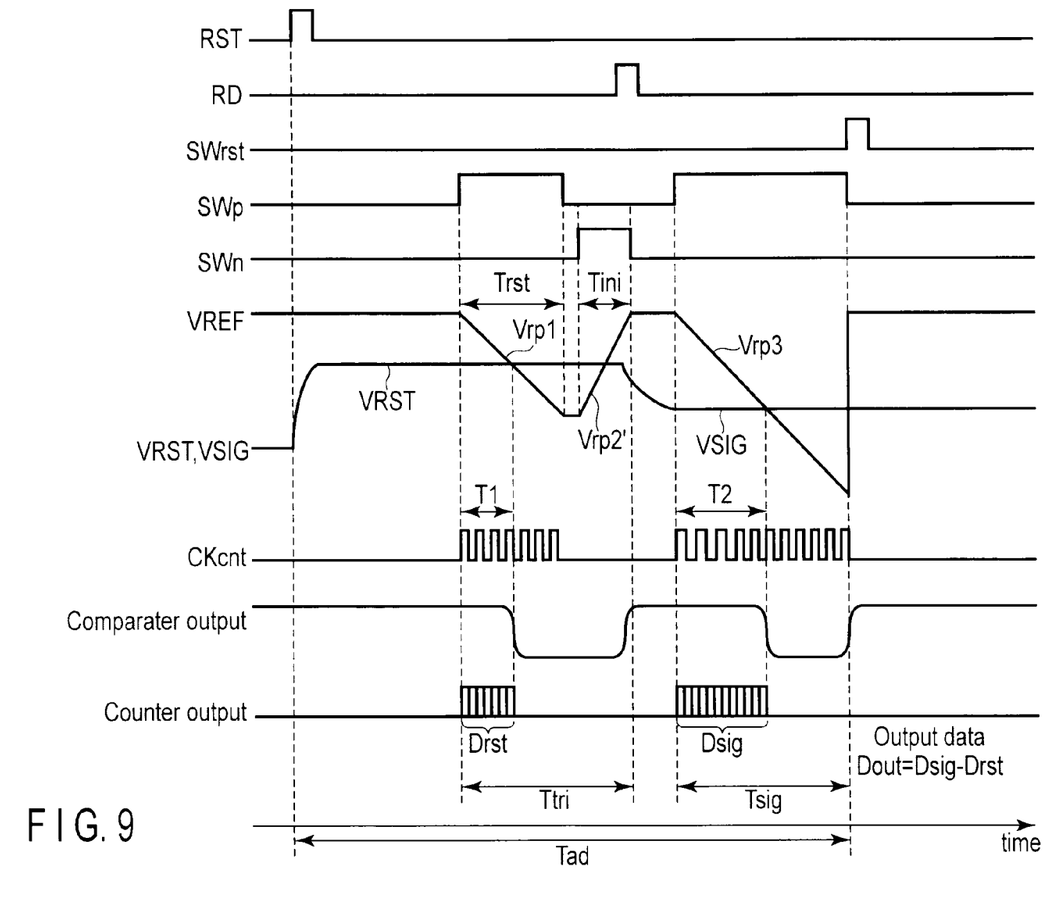
FIG. 9 is a chart for explaining the operation of an image sensor according to an embodiment.

The image quality of the image sensor can also be improved in the modifications of the image sensor according to the embodiment shown in FIG. 8 and FIG. 9 as in the image sensor according to the first and second embodiments.

When the reset voltage (here, the second pixel voltage) VRST is sampled after the sampling of the signal voltage (here, the first pixel voltage) VSIG in contrast to the sampling operation described above, the value of the reference voltage VREF used for sampling the signal voltage VSIG is returned to the initial value by drawing the discharge current of the integral capacitor 83 into constant current source 89A. In this case, the value of the reference voltage used for sampling the reset voltage VRST is returned to the initial value by switching on the reset switch 85. Thus, even if the order of the sampling of the signal voltage and the reset voltage is reversed as compared with the examples described above, the image sensor according to the present embodiment and its operation can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   an analog-to-digital conversion circuit which subjects a first pixel voltage and a second pixel voltage from pixels respectively comprising photoelectric conversion elements to first and second signal processing, and outputs a digital value corresponding to a difference value between the first pixel voltage and the second pixel voltage;
   a reference voltage generation circuit which outputs reference voltages having first and second pulse waveforms to the analog-to-digital conversion circuit, the reference voltages being compared with the first and second pixel voltages to obtain the digital value, the reference voltage generation circuit including: an integration circuit which comprises an operational amplifier having an output terminal coupled with the analog-to-digital conversion circuit and first and second input terminals, a capacitive element having one end connected to the second input terminal of the operational amplifier and the other end connected to the output terminal of the operational amplifier, a bias circuit connected to the first input terminal of the operational amplifier and supplying a bias voltage to the first input terminal of the operational amplifier; and a current source circuit connected to the second input terminal of the operational amplifier and supplying first and second currents to the second input terminal of the operation amplifier, wherein in the first signal processing which compares the reference voltage with the first pixel voltage by the analog-to digital conversion circuit, the reference voltage generation circuit supplies the first current of the current source circuit to the second input terminal of the operational amplifier, and generates the first pulse waveform, after the first signal processing, the reference voltage generation circuit supplies the second current of the current source circuit to the second input terminal of the operational amplifier, and returns a voltage value of the first pulse waveform to an initial value, and in the second signal processing which compares the reference voltage with the second pixel voltage by the analog-to-digital conversion circuit, the reference voltage generation circuit supplies the first current to the second input terminal of the operational amplifier, and generates the second pulse waveform.

2. The solid-state imaging device according to claim 1, wherein after the second signal processing, the reference voltage generation circuit short-circuits the one end of the capacitive element and the other end of the capacitive element to return a voltage value of the second pulse waveform to an initial value.

3. The solid-state imaging device according to claim 1, wherein the reference voltage generation circuit uses the integration circuit to perform integration of the first current, and generates the first and second pulse waveforms, and the reference voltage generation circuit uses the integration circuit to perform inverse integration of a discharge current of the capacitive element as the second current, and returns the voltage value of the first pulse waveform to the initial value.

4. The solid-state imaging device according to claim 1, further comprising:

a sample-and-hold circuit connected between the bias circuit and the first input terminal of the operational amplifiers, wherein in a period in which the reference voltage generation circuit outputs the reference voltage, an output of the bias circuit is sampled/held by the sample-and-hold circuit, and supplied to the first input terminal of the operational amplifier from the sample-and-hold circuit.

5. The solid-state imaging device according to claim 1, wherein a length of a period to return the voltage value of the first pulse waveform to the initial value is equal to a length of a period to output the first pulse waveform.

6. The solid-state imaging device according to claim 5, wherein an intensity of the second current is equal to an intensity of the first current.

7. The solid-state imaging device according to claim 1, wherein a length of a period to return the voltage value of the first pulse waveform to the initial value is shorter than a length of a period to output the first pulse waveform.

8. The solid-state imaging device according to claim 7, wherein an intensity of the second current is higher than an intensity of the first current.

9. The solid-state imaging device according to claim 1, wherein in a period from the start of the first signal processing to the return of the voltage value of the first pulse waveform to the initial value, the reference voltage generation circuit forms a triangular pulse, and in a period from the start of the second signal processing to the return of the voltage value of the second pulse waveform to the initial value, the reference voltage generation circuit forms a ramp waveform.

10. The solid-state imaging device according to claim 1, further comprising:

a control line connected to the pixels arrayed in a first direction;

signal lines connected to the pixels; and conversion units provided in the analog-to-digital conversion circuit and connected to the signal lines, respectively, wherein the common reference voltage is output to the conversion units, and each of the conversion units converts an analog value of the first pixel voltage to a digital value in accordance with a period in which a relation between an intensity of the reference voltage of the first pulse waveform and an intensity of the first pixel voltage are reversed, and converts an analog value of the second pixel voltage to a digital value in accordance with a period in which a relation between an intensity of the reference voltage of the second pulse waveform and an intensity of the second pixel voltage are reversed.

11. A solid-state imaging device comprising:

an analog-to-digital conversion circuit which outputs a digital value corresponding to a difference value between a first pixel voltage and a second pixel voltage from pixels respectively comprising photoelectric conversion elements;

a reference voltage generation circuit which outputs reference voltages having first and second pulse waveforms to the analog-to-digital conversion circuit, the reference voltages being compared with the first and second pixel voltages to obtain the digital value, the reference voltage generation circuit including an integration circuit comprising an operational amplifier which is provided with an output terminal and first and second input terminals, and a capacitive element having one end connected to the second input terminal of the operational amplifier and the other end connected to the output terminal of the operational amplifier, and a current source circuit comprising a first current source which supplies a first current to the second input terminal of the operational amplifier via a first switch element, and comprising a second current source which supplies a second current to the second input terminal of the operational amplifier via a second switch element; and a bias circuit which outputs a bias voltage to the first input terminal of the operational amplifier.

12. The solid-state imaging device according to claim 11, wherein
the reference voltage generation circuit supplies the first current to the second input terminal of the operational amplifier from the first current source of the current source circuit, and generates the first and second pulse waveforms of the reference voltage, and
the reference voltage generation circuit draws second current into the second current source of the current source circuit from the second input terminal of the operational amplifier to return a voltage value of the first pulse waveform to an initial value.

13. The solid-state imaging device according to claim 11, further comprising:
a third switch element connected in parallel with the capacitive element,
wherein the third switch element is switched on, the one end of the capacitive element is connected to the other end of the capacitive element by the third switch element in an on-state and the capacitive element is discharged when a voltage value of the second pulse waveform is returned to an initial value.

14. The solid-state imaging device according to claim 11, further comprising:
a sample-and-hold circuit connected between the bias circuit and the first input terminal of the operational amplifier,
wherein in a period in which the reference voltage generation circuit generates the reference voltage, the bias circuit is electrically disconnected from the operational amplifier, and the bias voltage held by the sample-and-hold circuit is output to the first input terminal of the operational amplifier.

15. The solid-state imaging device according to claim 11, wherein
a length of a period to return a voltage value of the first pulse waveform to the initial value is equal to a length of a period to output the first pulse waveform.

16. The solid-state imaging device according to claim 15, wherein
an intensity of the second current is equal to an intensity of the first current.

17. The solid-state imaging device according to claim 11, wherein
a length of a period to return a voltage value of the first pulse waveform to the initial value is shorter than a length of a period to output the first pulse waveform.

18. The solid-state imaging device according to claim 17, wherein
an intensity of the second current is higher than an intensity of the first current.

19. The solid-state imaging device according to claim 11, wherein
in a period from the start of a first signal processing which compares the reference voltage with the first pixel voltage by the analog-to-digital conversion circuit to the return of a voltage value of the first pulse waveform to the initial value, the reference voltage generation circuit forms a triangular pulse, and
in a period from the start of a second signal processing which compares the reference voltage with the second pixel voltage by the analog-to-digital conversion circuit to the return of a voltage value of the second pulse waveform to the initial value, the reference voltage generation circuit forms a ramp waveform.

20. The solid-state imaging device according to claim 11, further comprising:
a control line connected to the pixels arrayed in a first direction;
signal lines connected to the pixels; and
conversion units provided in the analog-to-digital conversion circuit and connected to the signal lines, respectively,
wherein the common reference voltage is output to the conversion units, and
each of the conversion units converts an analog value of the first pixel voltage to a digital value in accordance with a period in which a relation between an intensity of the reference voltage of the first pulse waveform and an intensity of the first pixel voltage are reversed, and converts an analog value of the second pixel voltage to a digital value in accordance with a period in which a relation between an intensity of the reference voltage of the second pulse waveform and an intensity of the second pixel voltage are reversed.

* * * * *